July 2, 1929. C. M. HIBBETS 1,719,369
OPERATING MECHANISM FOR TRANSMISSION GEARS
Filed May 17, 1928 2 Sheets-Sheet 1

Charles M. Hibbets.
INVENTOR

By John B. Thomas & Co.
ATTORNEYS.

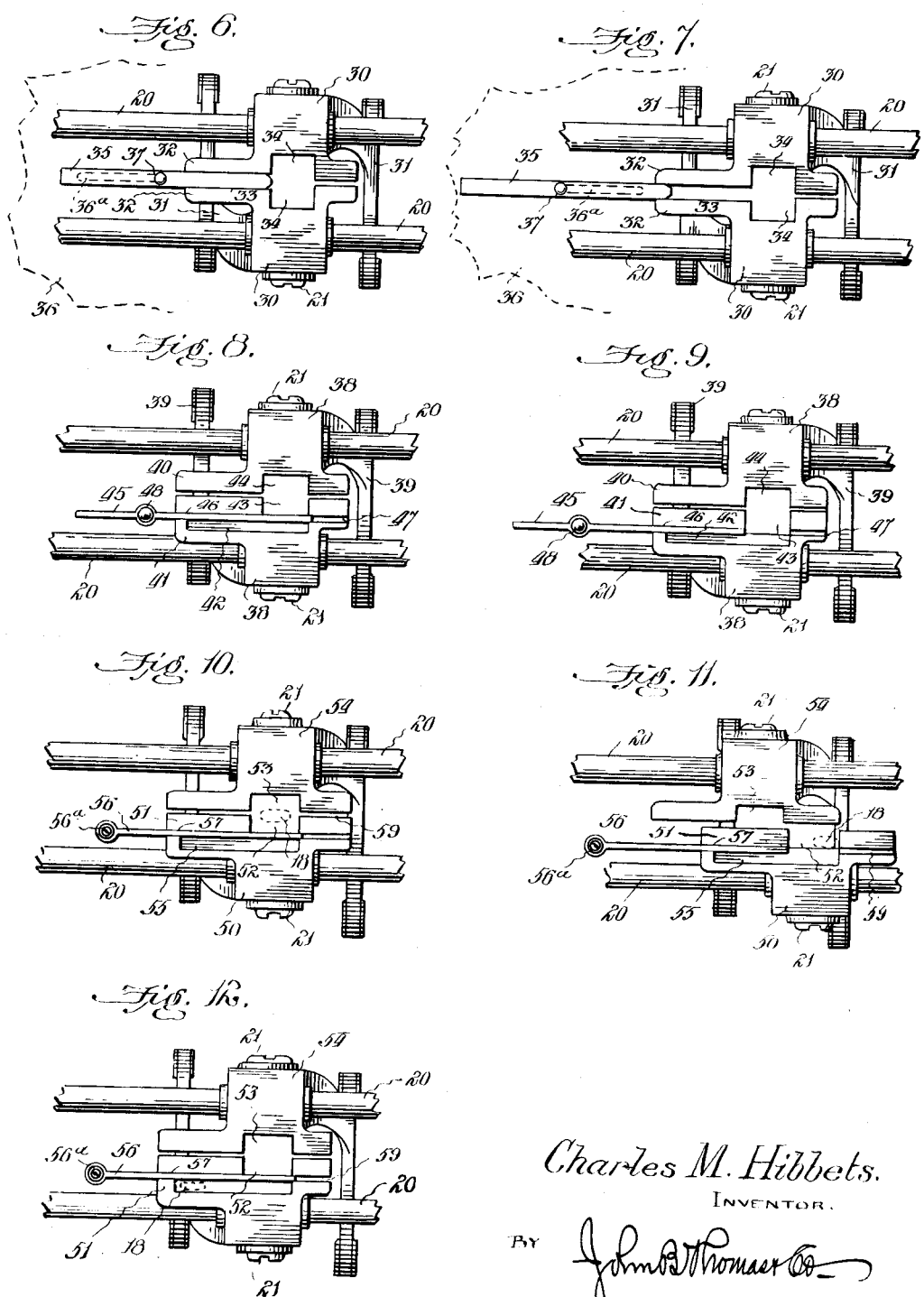

Patented July 2, 1929.

1,719,369

UNITED STATES PATENT OFFICE.

CHARLES M. HIBBETS, OF CLAUDE, TEXAS.

OPERATING MECHANISM FOR TRANSMISSION GEARS.

Application filed May 17, 1928. Serial No. 278,429.

My invention is an improvement in mechanism for operating the transmission gears of automobiles, in the present instance providing for moving the gear-shift lever forwardly out of the way of the driver so that he may conveniently enter and leave the automobile at the side thereof opposite his seat, with the gears left in neutral.

In the conventional form of gear-shift lever employed in connection with many types of automobiles the upper end of the lever is bent rearwardly so that in neutral position it will be within easy reach of the driver for operation of the transmission gears in starting the automobile, and in this position of said gear-shift lever it projects in the way of the driver entering and leaving his seat by way of the other side of the automobile, it being understood of course that it is customary to locate the driver's seat at the left-hand side of an automobile and that it is safer for the driver to enter and leave at the right-hand side especially when the automobile is drawn up alongside of a roadway at the right-hand side thereof as required by traffic regulations.

The main object of my invention therefore is to provide for moving the gear-shift lever bodily forward above its pivot-point, and I accomplish this in an effective manner by a particular construction of the upper ends or heads of the yoke-members in which the lower end of said gear-shift lever works and which operate the slidable gears of the transmission, and as the arrangement in the present instance permits of the gear-shift lever being moved to its maximum forward position, or well out of the way for clearance of the passageway, when brought to neutral position and pushed forward it not only leaves the desired clearance but also insures the neutral position of the transmission gears when the driver leaves his seat thereby serving as a check against leaving said gears in mesh for the operation of the automobile, it being understood that the forward movement for clearing the passageway does not disturb the neutral position of the transmission gears.

Other objects and advantages of my invention will be obvious from the following description, and what I desire to protect by Letters Patent is more specifically set forth in the appended claims.

In the drawings:

Figs. 6 and 7 are plan views illustrating a further modification of the invention, in which a movable member is used to close the lever receiving slot.

Figs. 8 and 9 show a different form of lever receiving slot and movable member for closing the same, and Figs. 10, 11 and 12 show a modification of the arrangement illustrated in Figs. 8 and 9.

Figure 1:
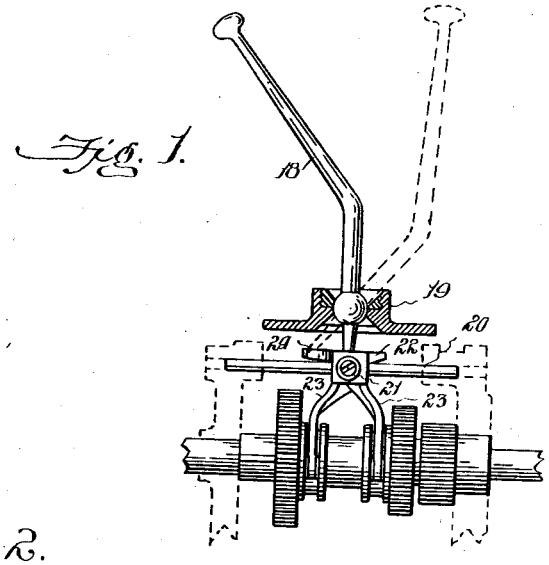
Figure 1 is a side elevation showing a set of transmission gears with the operating mechanism in accordance with my invention applied thereto.
Figure 2:
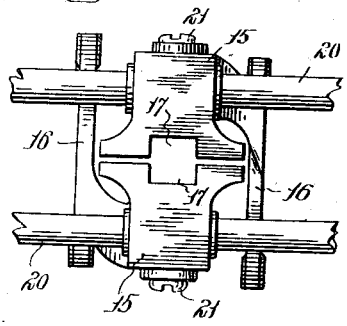
Fig. 2 is a plan view of companion yoke-members employed for shifting the transmission gears and showing the usual form of alining recesses in which the lower end of the gear-shift lever works.

By reference to the drawings it will be noted that I merely modify the construction or formation of the upper ends or heads of the yokes from the conventional form illustrated in Fig. 2 in which the heads 15 15 of the yokes 16 16 are provided with the usual rectangular recesses 17 17 to receive the lower end of the gear-shift lever 18 and brought in alinement with each other when the transmission gears and said lever are in neutral position, the lower end of the gear-shift lever engaging the shoulders at the ends of the recesses for shifting the yokes, respectively, in changing the gears, as will be understood. Furthermore, my invention is shown in connection with the ordinary form of bent lever, as shown in Fig. 1, pivoted by ball and socket joint in a bearing-block 19, and the yokes are slidable as usual by means of parallel rods 20 20 to which they are keyed by screws 21, and of course in some instances the yoke-heads are narrower transversely with the rods correspondingly closer together, as for instance as illustrated in Figs. 6 to 12, inclusive.

Figure 3:
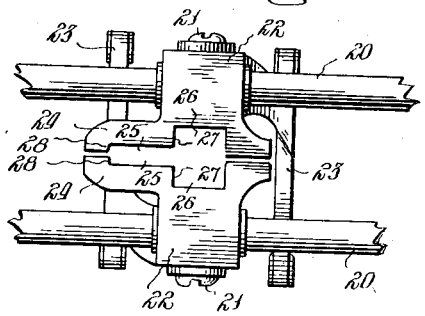
Fig. 3 is a similar view showing the preferred form of construction of the yoke-heads.

In carrying out my invention as illustrated in Fig. 3 the head 22 of each yoke 23 is provided with a longitudinal extension 24 at one side to accommodate the formation of a shallow recess 25 extending rearwardly from the usual recess 26 in which the gear-shift lever normally operates, it being noted that said last mentioned recess is slightly deeper than usual to provide the required operating shoulder 27 at the rear end thereof alongside of the inner end of the aforementioned shallow recess, and that when the yoke heads are in alinement or in neutral position with respect to the gear-shift lever and gears the said shallow recesses will form a slot at the rear end of the rectangular recess 26—26 into which the lower end of the gear-shift lever may be moved to throw the upper bent end or handle portion forwardly out of the way of the driver entering and leaving the automobile at the right-hand side thereof when the driver's seat is located on the left-hand side. Of course the extent of the forward movement of the handle portion of the gear-shift lever may be limited by the conical recesses 19ª in the bearing-block 19 above and below the ball and socket-joint, as shown in Fig. 1, or by the shoulders 28 at the rear end of the slot, as shown in said Fig. 3. Obviously the slot which provides for the desired movement of the lever will not interfere with the ordinary operations of said lever in shifting gears, and as the lever is not moved into the slot until it is first brought to neutral position the extreme forward position thereof will serve to indicate that the gears are in neutral position. However, means to prevent the lower end of the lever being moved into the slot until desired may be provided, as hereinafter described.

In order to prevent the lower end of the gear-shift lever being accidentally moved into the slot while the gears are being changed to a different gear ratio, especially low to medium or vice versa in the three speeds forward transmission, by shielding the slot so that the lower end of said gear-shift lever cannot be moved into it by an inexperienced driver in changing gears I provide auxiliary means for closing the inner end of the slot during the usual operation of the gear-shift lever in shifting the transmission gears, and inasmuch as this can be accomplished in several ways I have illustrated in Figs. 6 to 12, inclusive, several constructions embodying this feature of my invention.

As illustrated in Figs. 6 and 7 the heads 30 30 of the yokes 31 31 are of substantially the same formation as shown in Fig. 3, that is provided with extensions 32 32 for the slot 33 and cut away in the body portion thereof to form the rectangular recess 34 in which the gear-shift lever operates in changing the gears from neutral position, but in this instance the slot extends through the outer ends of said extensions to receive a sliding plate or flat rod 35 supported in suitable guides attached to a stationary part of the automobile, as for instance under the floor indicated in dotted lines, and having a button 37 projecting through a slot 36ª in the floor by which said rod may be operated to close the slot as shown in Fig. 6, or open the same as in Fig. 7. Of course when the slot is closed there will be no possibility of the gear-shift lever being moved into the same in shifting the gears by moving either one of the yokes rearwardly, and to prevent the lower end of the lever catching on the inner end of the rod the latter is beveled as shown. This arrangement provides a safeguard attachment to the arrangement or form of the invention shown in Fig. 3.

In Figs. 8 and 9 I have shown a modification of the safeguard attachment, and in this instance the slot providing for the movement of the lever out of the way of the driver, as well as the sliding rod or guard, are both located in the head of one of the yokes. In this form of my invention the heads 38 38 of the yokes 39 39 are also provided with extensions 40 and 41, but instead of forming the slot 42 between said extensions, as in the other forms hereinbefore described, it is located on a line with the inner end of the recess 43 which with the recess 44 in the companion yoke-head form the rectangular recess in which the lower end of the lever works in changing the gears from neutral position in driving the automobile forward or backward, it being noted that the aforesaid recess 43 is deeper than usual so as to provide for an extension of slot 42 defined by the sliding rod or guard 45 which in this instance slides in a groove 46 in the yoke-head alongside of the slot 42 and into a groove 47 at the opposite side of said recess 43. The guard or sliding rod is also provided with an operating button 48 and when slid to the position shown in Fig. 8 it will form the usual rectangular slot in which the lever works, and when slid to the position shown in Fig. 9 it will permit the lower end of the lever to be moved further into recess 43 and then into the slot 42 so that the upper end of said lever can be moved out of the way of the driver entering and leaving his seat. It will be understood that in the normal operation of the gear-shift lever in driving the car the sliding bar or guard will be moved to close that part of the recess 43 on a line with the slot 42, and that when it is desired to move the lever to its extreme forward position it is first brought to neutral position before sliding the guard backward for opening passageway to the slot 42.

In the modification shown in Figs. 10, 11 and 12 an arrangement is shown by which to better provide against the transmission gears being left in mesh when the upper part of the gear-shift lever is moved to its extreme forward position so as to be out of the way of the driver, for in this instance it will be obvious that the yoke with which the guard plate or rod cooperates is brought to neutral position by the operation of the upper part of the lever to its extreme forward position, the companion yoke being previously brought to neutral position. The construction to accomplish this desirable operation is somewhat similar to that shown in Figs. 8 and 9, that is to say yoke-head 50 is provided with extension 51 and recess 52, the latter cooperating with recess 53 in the companion yoke-head 54, said recess 52 also being of sufficient depth to provide an extension of slot 55 separated from the other part of the recess by the guard or flat rod 56 working in a groove 57 in the extension 58 of said yoke-head 50 and in a groove 59 at the opposite side of the recess; but in this instance the guard or flat bar 56 is stationary and in order that the lower end of the lever may enter the slot the yoke must be moved to the forward position shown in Fig. 11 to clear the deep recess 52 or move it beyond the inner end of the guard so that the lower end of the lever can be moved into the slot, and as the upper end of said lever is moved to its extreme forward position the lower end thereof will return yoke 50 to its neutral position, it being understood that the companion yoke can be only left in neutral position during this operation. Consequently the manipulation of the gear-shift lever to move the upper part thereof to extreme forward position automatically brings the parts to neutral position.

Figure 4:
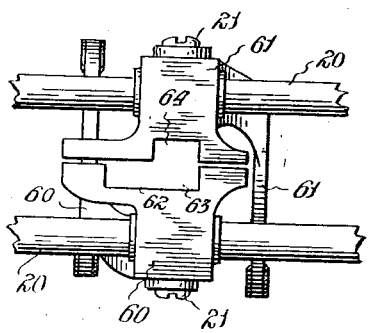
Fig. 4 shows a modification in the formation of the yoke-heads.
Figure 5:
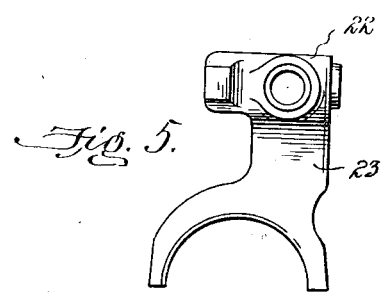
Fig. 5 is a detail view of one of the yokes.

The modification shown in Fig. 4 is very similar to that shown in Figs. 10, 11 and 12, just described, in that the yoke-head 60 cooperating with the yoke-head 61 in operating the transmission gears is provided with a slot 62 on a line with the deep-seated recess 63 adapted to register with the recess 64 in the companion yoke-head, but in this instance no auxiliary means is provided for dividing the deep-seated recess as the gear-shift lever is moved excessively forward not only to be out of the way of the driver but also to operate the transmission gear by engaging the shoulder 65 at the inner end of said slot.

It will be obvious from the foregoing description in connection with the accompanying drawings that in the several different forms of my invention provision is made for moving the gear-shift lever bodily so that the upper portion thereof will be out of the way of the driver entering and leaving the automobile from the right-hand side thereof when the driver's seat is located on the left-hand side, and of course it is safer to enter and leave this way for the reason that traffic regulations require that an automobile be driven and stopped at the right hand side of a roadway, and if the driver got out by way of the left-hand side he would be in the way of moving traffic, it being understood that in every instance when the gear-shift lever is moved forward out of the way the gears are left in neutral.

The extent of the forward movement of the gear-shift lever to provide clearance or passageway in front of the driver's seat will be regulated by the depth of the slot in the yokeheads to receive the lower end of the lever, and although I have shown several modifications of my invention others may be made within the spirit and scope of my claims.

I claim:—

1. In a transmission gear for motor vehicles comprising a gear shift lever and yokes, the latter having a rectangular recess therein, a slot in the yoke heads to receive the lower end of the lever and extending rearwardly from the rectangular recess in which said lower end of the lever operates in changing the gears for movement of the upper end of the lever out of the way of the driver entering and leaving the automobile.

2. In a transmission gear for motor vehicles comprising a gear shift lever and yokes, the latter having a rectangular recess therein, a slot in the yoke heads to receive the lower end of the lever and extending rearwardly from the rectangular recess in which said lower end of the lever operates in changing the gears for movement of the upper end of the lever out of the way of the driver entering and leaving the automobile, and means for limiting the movement of the lever in said slot.

3. In a transmission gear for motor vehicles comprising a gear shift lever and yokes, the latter having a rectangular recess therein, a slot in the yoke heads to receive the lower end of the lever and extending from the rectangular recess in which said lower end of the lever operates in changing the gears for movement of the upper end of the lever out of the way of the driver entering and leaving the automobile, and means for closing the slot against movement of the lower end of the lever into the same in the normal operation of said lever.

4. In a transmission gear for motor vehicles comprising a gear shift lever and yokes, the latter having a rectangular recess therein, a slot extending from the rectangular recess in the yoke heads in which the lower end of the lever operates in changing the gears for movement of the upper end of the lever out of the way of the driver entering and leaving the automobile, and a guard adapted to close the slot with respect to the recess.

5. In a transmission gear for motor vehicles comprising a gear shift lever and yokes, the latter having a rectangular recess therein, a slot extending from the rectangular recess in the yoke heads and adapted to receive the lower end of the lever for movement of the upper end of the lever out of the way of the driver entering and leaving the automobile, and a guard adapted to protect the slot against the movement of the lever thereinto.

6. In a transmission gear for motor vehicles comprising a gear shift lever and yokes, the latter having a rectangular recess therein, a slot in one of the yoke heads extending rearwardly from the rectangular recess in which the lower end of the lever operates in changing the gears for movement of the upper end of the lever out of the way of the driver entering and leaving the automobile, and a guard at one side of the slot adapted to extend into the recess and divide the same.

7. In a transmission gear for motor vehicles comprising a gear shift lever and yokes, the latter having a rectangular recess therein, a slot in one of the yoke heads extending rearwardly from the inner end of the recess therein in which the lower end of the gearshift lever operates in changing the gears and into which slot said lower end of the lever moves for shifting the upper end out of the way of the driver entering and leaving the automobile.

8. In a transmission gear for motor vehicles comprising a gear shift lever and yokes, a deep-seated recess in the yokes in which the lever operates in changing the gears, and a slot extending rearwardly from the inner end of said deep-seated recess to receive the lower end of the lever for moving the upper part thereof excessively forward.

9. In a transmission gear for motor vehicles comprising a gear shift lever and yokes, a deep-seated recess in one of the yokes in which the lower end of the lever operates in changing the gears, a slot extending rearwardly from the inner end of said deep-seated recess to receive the lower end of the lever for moving the upper end thereof excessively forward, and a guard dividing the deep-seated recess on a line with the outer edge of the slot.

CHARLES M. HIBBETS.